(12) United States Patent
Bost

(10) Patent No.: US 10,674,716 B1
(45) Date of Patent: Jun. 9, 2020

(54) MODULAR PEST TRAP ASSEMBLY

(71) Applicant: Tony Bost, Sumner, TX (US)

(72) Inventor: Tony Bost, Sumner, TX (US)

(*) Notice: Subject to any disclaimer, the term of this patent is extended or adjusted under 35 U.S.C. 154(b) by 0 days.

(21) Appl. No.: 16/533,762

(22) Filed: Aug. 6, 2019

(51) Int. Cl.
  *A01M 1/16* (2006.01)
  *A01M 23/00* (2006.01)
  *A01M 1/14* (2006.01)

(52) U.S. Cl.
  CPC ............... *A01M 1/16* (2013.01); *A01M 1/14* (2013.01); *A01M 23/005* (2013.01)

(58) Field of Classification Search
  CPC ........ A01M 1/14; A01M 1/16; A01M 23/005; A01M 23/02
  USPC .............................................. 43/58, 107, 114
  See application file for complete search history.

(56) References Cited

U.S. PATENT DOCUMENTS

| | | | | |
|---|---|---|---|---|
| 1,655,128 A * | 1/1928 | Berghorn | ................ | A01M 1/14 43/114 |
| 2,258,683 A * | 10/1941 | Ketterer | .................. | A01M 1/02 43/114 |
| 3,729,858 A * | 5/1973 | Bradshaw | ................ | A01M 1/14 43/114 |
| 4,425,731 A * | 1/1984 | Orlando | .............. | A01M 23/005 229/115 |
| 4,959,924 A * | 10/1990 | Martin | ..................... | A01M 1/14 43/114 |
| 4,998,376 A * | 3/1991 | Scherjbak | ................ | A01M 1/02 43/121 |
| 5,384,981 A * | 1/1995 | Cohen | ..................... | A01M 1/14 43/114 |
| 5,398,442 A * | 3/1995 | Musket | ................... | A01M 1/14 229/120.09 |
| 5,572,825 A * | 11/1996 | Gehret | .................... | A01M 1/02 229/120.11 |
| 6,516,558 B1 * | 2/2003 | Lingren | .................. | A01M 1/02 43/107 |
| 2013/0067796 A1 * | 3/2013 | Dong | ...................... | A01M 1/14 43/109 |

(Continued)

OTHER PUBLICATIONS

International Search Report and Written Opinion in related International PCT App No. PCT/US2019/051697, dated Nov. 5, 2019, 10 pages.

*Primary Examiner* — Darren W Ark
*Assistant Examiner* — Brady W Frazier
(74) *Attorney, Agent, or Firm* — Law Office of Jeff Williams PLLC; J. Oliver Williams

(57) ABSTRACT

The modular pest trap assembly of the present application includes a modular relatively planar structure that is configured to be adaptable for different methods and areas of a structure for the capture of pests. The assembly includes a modular structure having a main body with a first face and a second face. The modular structure also includes a corner and a plurality of sides. An adhesive layer extends across a portion of the second face of the modular structure. A detachable film cover lays across the adhesive layer to permit handling without contact of the adhesive layer. Additionally, an attachment member is selectively located adjacent to at least one of the plurality of sides of the modular structure for the purpose of securing the modular structure to a corner structure. Flaps extend inward into the corner structure to extend available adhesive internally to the total void space.

13 Claims, 8 Drawing Sheets

(56) References Cited

U.S. PATENT DOCUMENTS

| | | | |
|---|---|---|---|
| 2013/0067797 A1* | 3/2013 | Aroniss | A01M 1/14 43/114 |
| 2013/0283673 A1* | 10/2013 | Reinke | A01M 1/02 43/114 |
| 2014/0013651 A1* | 1/2014 | Moss | A01M 23/005 43/114 |
| 2015/0007486 A1* | 1/2015 | Backmark | A01M 1/2011 43/114 |
| 2015/0047250 A1* | 2/2015 | Parks | A01M 1/14 43/114 |
| 2017/0223944 A1* | 8/2017 | Bost | A01M 1/14 |

* cited by examiner

MODULAR PEST TRAP ASSEMBLY

BACKGROUND

1. Field of the Invention

The present application relates to a device and method of capturing pests and insects, and more particularly to a modular pest trapping assembly for use in multiple configurations to allow attachment into corners of a room or along a surface for the purpose of attracting and capturing assorted pests.

2. Description of Related Art

It is highly undesirable to tolerate the presence of insects within a home or dwelling, whether it be a commercial or residential dwelling. Insects can carry diseases and are generally unhealthy for human and pet exposure. Millions of dollars each year is spent on the treatment and eradication of insects from dwellings. Typically sprays are used or assorted traps. The sprays are generally applied along the baseboard and are used to help prevent the entrance of insects into the home. Powders may also be used similarly to that of sprays. The powders can be applied around plumbing spaces, such as under the sinks. Traps are used to capture insects that have already entered the dwelling. These are laid on a surface and wait for the insect to pass inside and become trapped. The surfaces are relatively flat and close to the ground. Although these types of devices and treatment methods have some effect, none appear able to handle insects that remain in the upper portions of the dwellings.

For example, spiders typically stay away from the lower levels of the home and can be found around the ceiling. Insects (especially spiders) are intensely attracted to corners during their hunt for other insects and a place of desired living. The spiders that go into corners do so mainly because of the webbing techniques due to the various angles, the darker shadows which are typically found in corners yielding privacy, and the heat factor (more relative to corners near ceilings) where the spiders find for suitable as well as other insects which they can expect to travel to these corners also.

However, none of the traps and spray treatment methods described adequately address the presence and deterrence of insects, pests, and spiders in upper and lower corners of the dwellings or along runs on a surface. Although some strides have been made with respect to pest control methods, considerable shortcomings remain.

SUMMARY OF THE INVENTION

The assembly of the present application includes a modular relatively planar structure that is configured to be adaptable for different methods and areas of a structure for the capture of insects, spiders and pests in general. The assembly includes a modular structure having a main body with a first face and a second face. The modular structure also includes a corner and a plurality of sides. An adhesive layer extends across a portion of the second face of the modular structure. A detachable film cover lays across the adhesive layer to permit handling without contact of the adhesive layer. Additionally, an attachment member is selectively located adjacent to at least one of the plurality of sides of the modular structure for the purpose of bonding or securing the modular structure to a corner structure. A fold line exists in the modular structure and extends between neighboring sides so as to permit a first flap to be folded over the main body. The folded first flap is configured to create a three-dimensional void space with the main body.

An object of the present application is to provide a singular trap assembly that is capable of attachment to corners of a room in both elevated positions and along a lower surface. A further object is to provide an adhesive capturing surface along a face of the modular structure that captures pests and insects upon contact. Furthermore, the assembly is configured to allow pests and insects to pass through an optionally available aperture within the main body and/or to permit them to pass through one or more sides of the modular structure when set up. The shape of the assembly is ideally triangular to permit close contact around the edges of the main body within the corners.

The trap assembly may include multiple fold lines and detachable lines to allow neighboring corners to be removed. Additionally, the use of multiple fold flaps may be folded toward one another and contact along a flap edge. The attachment members may be located at the flap edge along the first face while the other attachment members, each located about a corner of the main body, may be located along the second face of the main body.

An additional use of the trap assembly of the present application is the ability to use as a flat glue trap wherein the film cover over the adhesive layer is removable and the modular structure, unmodified, may be laid along a surface with the adhesive layer facing upward to capture passing pests and insects.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
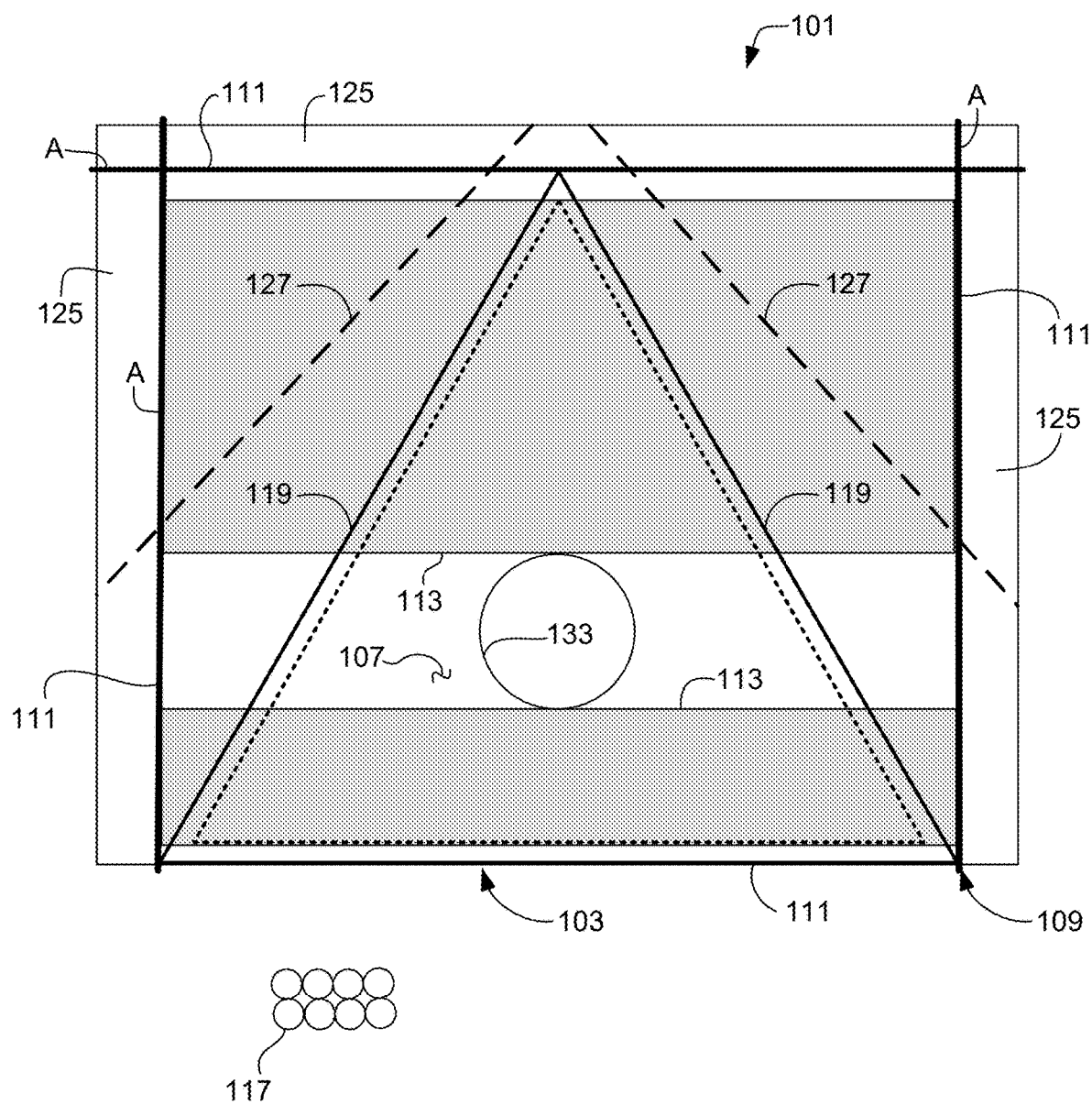
FIG. 1 is a rear view of a modular trap assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with elevated platforms discussed previously. In particular, the modular pest trap assembly of the present application is adaptable for application in upper and lower corners and along surfaces as a flat glue trap. The assembly is configurable in both a flat configuration and a trapezoidal three-dimensional configuration wherein the modular structure of the trap forms the three-dimensional shape to include a void space within. The assembly is usable for the capture of insects, pests, rodents, spiders, and other small flying or ground based bugs. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The embodiments and method of the present application is illustrated in the associated drawings. The trap assembly includes a modifiable flat modular structure with one or more foldable flaps to permit the formation of a void space. The assembly can provide detachable portions to use as flat glue traps as well as simultaneously providing the three-dimensional void space as a trap for inclusion into one or more corners. The assembly is able to be selectively located and repositioned or moved as desired. It is disposable as well. Additional features and functions are illustrated and discussed below.

As noted above an object of the device of the present application is to entrap pests, including spiders, insects, rodents and other creatures (herein referred to collectively as "pests") within corners as a form of eliminating them inside and outside homes, businesses, schools, underneath tables, beds, and anywhere else where the assembly may be found needful because of its beneficial capabilities.

It is also worth noting that a method of attracting the pests to come into contact with the assembly is also conceived as the assembly may include a pheromone or other type of baiting technique to lure such pests into contact with the adhesive layer therein and become trapped.

Typical places for use of the assembly are closets, attics, bedrooms, kitchens, living rooms, bathrooms, and other rooms where spiders will be attracted to the corners (especially near the ceilings). These locations are appealing for pests for many reasons, such as visibility of all surroundings for a sense of security, webbing techniques, shadowed areas, and warmer climates which naturally lure the pests (especially spiders) to these corners. The device may be placed into corners or along surfaces and left alone until the user decides to either remove the device at their convenience to dispose of any entrapped pests to then replace the device and/or setup the assembly in a new area to eventually maintain greater control over the pests from ever gathering into corners again since the pests feed in these areas and multiply rapidly.

Before delving into a description of the assembly, it is understood that the modular structure may include stylistic indicia along any face. The indicia may be useful to convey messages to a user or to blend the modular structure assembly with the various interior designs of businesses, homes, schools, and other places for the appreciated usage of the device.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIGS. 1-4 in the drawings, rear views of a modular trap assembly 101 according to the present application is illustrated. The assembly 101 is a modular structure having a main body 103 with a first face 105 (see FIG. 5) and a second face 107. The modular structure also includes a corner 109 and a plurality of sides 111. An adhesive layer 113 extends across a portion of the second face 107. A detachable film cover 115 lays across the adhesive layer 113 to permit handling without contact of the adhesive layer. Additionally, an attachment member 117 is selectively located adjacent to at least one of the plurality of sides 111 of the modular structure for the purpose of bonding or securing the modular structure to a surface. A fold line 119 exists in the modular structure and extends between neighboring sides 111 so as to permit a first flap 121 to be folded over the main body. The folded first flap 121 is configured to create a three-dimensional void space 123 with the main body.

Figure 2:
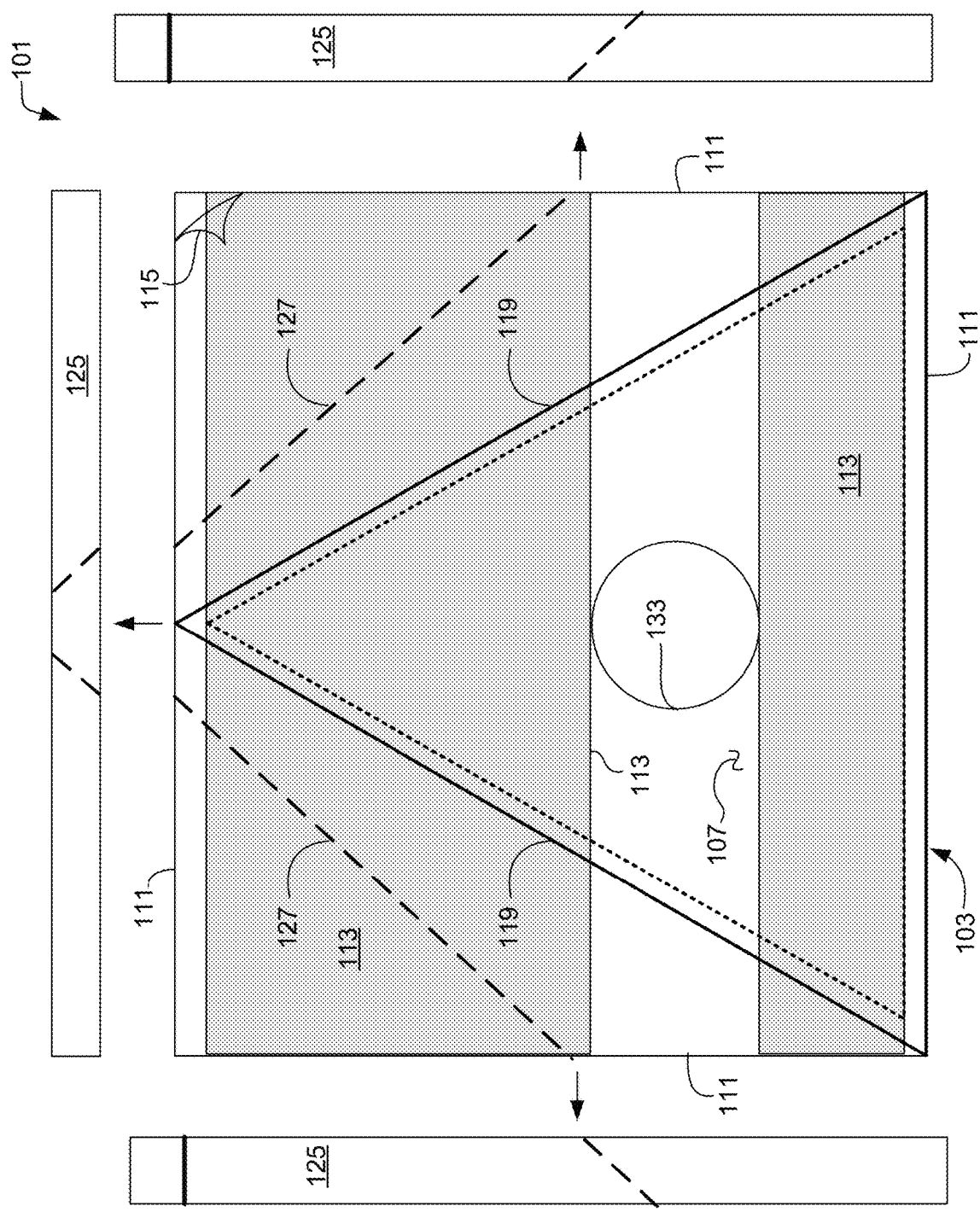
FIG. 2 is an alternate rear view of the modular trap assembly of FIG. 1.

Referring in particular to FIGS. 1 and 2, assembly 101 may be formed during manufacturing from a single relatively flat material and stamped to shape. One such configuration is shown in FIG. 1. In this configuration, side tabs 125 are located along sides 111. These side tabs 125 typically do not have any adhesive layer 113 and are meant to be removed upon use by tearing off at lines A. Assembly 101 is not limited to any particular number or shape with respect to tabs 125. Additionally, it is conceived that tabs 125 may not even be included or necessary but are optional only. Determination of their inclusion may be decided upon manufacturing constraints. If used, tabs 125 are removed.

Assembly 101 includes adhesive layer 113 that extends across a portion of second surface 107. Adhesive layer 113 is not needed on tabs 125 and is therefore not typically used thereon. Film cover 115 is located along the top of second surface 107 and is configured to overlay across adhesive layer 113 so as to prevent unnecessary contact with adhesive layer 113 prior to use. Film cover 115 may cover all of second surface 107 or just portions that have adhesive layer 113. It is not necessary that film cover 115 overlay portions of tabs 125, although such may occur optionally if desired. Film cover 115 is disposable and removable. It may be transparent or have selected coloring. Graphical indicia may be located across its outer surface for conveying information as well. A user would peel away film cover 115 prior to installation so as to expose adhesive layer 113.

Figure 3:
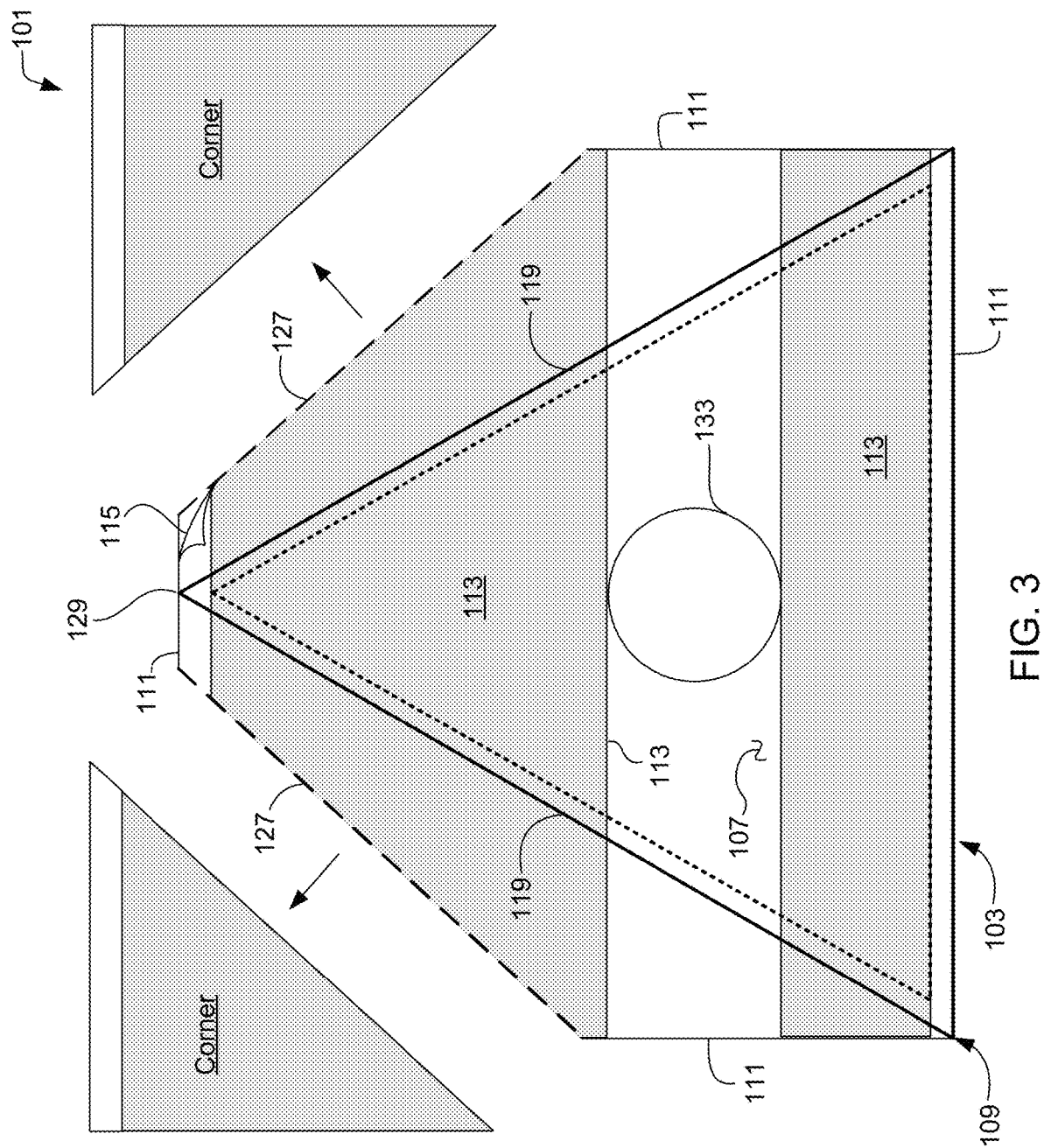
FIG. 3 is an alternate rear view of the modular trap assembly of FIG. 2 with displaced corners.

Referring now in particular to FIG. 3, assembly 101 also includes one or more detachable lines 127. As seen in FIG. 3, tabs 125 have been removed, showing the modular structure ready for use. At this stage a user may elect to only remove film cover 115 so as to use assembly 101 as a flat glue trap. Alternatively, a user may proceed to modify assembly 101 for use at a three-dimensional structure for use in corners. Further discussion will relate to the latter, where the assembly 101 is modified for use with corners.

Detachable lines 127 extend between neighboring sides 111 of the modular structure. These are angled so as to isolate a corner of the modular structure. The detachable lines 127 are oriented so as to avoid contact with main body 103. The angle of the detachable lines 127 are such that they may or may not be angled parallel to adjacent sides of main body 103. In the depicted embodiment, detachable lines 127 are angled more steeply such that along the top of main body 103, lines 127 are closer to main body 103 compared to locations lower down the structure. The tip 129 of main body 129 is flush with line A from the tabs 125. The corners are shown detached as they may be separable along lines 127. Lines 127 may be any form of tearable line or crease. An example may be a perforated line or edge.

Figure 4:
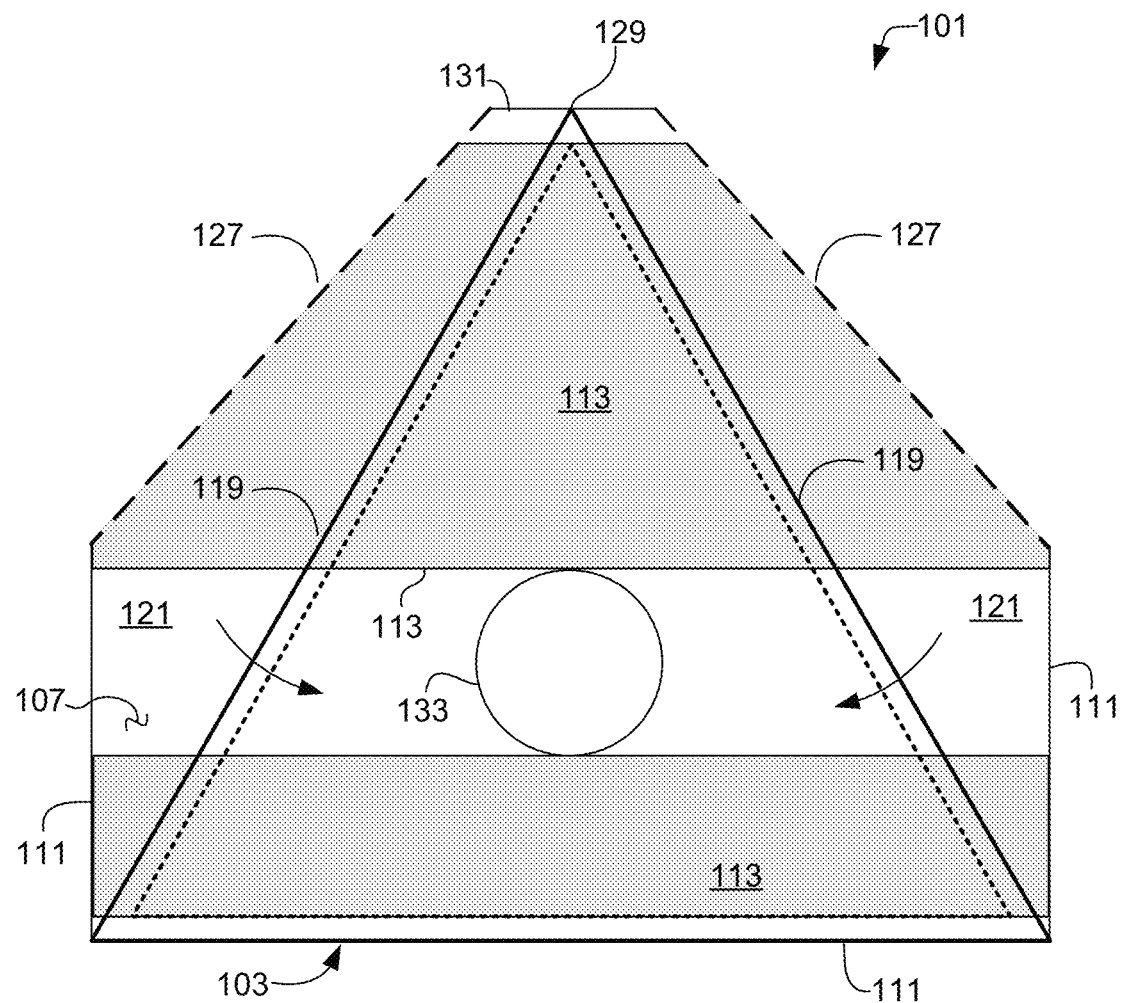
FIG. 4 is an alternate rear view of the modular trap assembly of FIG. 3 with the corners removed and fold lines illustrated.

Referring now also in particular with FIG. 4, assembly 101 also includes one or more fold lines 119. Fold lines 119 are a crease formed in the modular structure that permits folding. Fold lines 119 pass from a bottom side upward to the top side where the fold lines 119 come together to form tip 129. At the bottom side, the lines 119 are separated. The fold lines 119, in combination with bottom side 111 define the shape and size of main body 103. Everything within the area of lines 119 and the bottom side 111 are termed main body 103. The shape of main body 103 is triangular, preferably an isosceles triangle. This helps assembly 101 to fit into corners. Other shapes are possible wherein any number of corners may be removed, detachable lines 127 may exist, and fold lines may be formed so as to generate any shape desired. For example, main body 103 may have an area shaped in the form of a pentagon, a rectangle, a hexagon, and so forth. Any number of sided polygon, with or without equal length sides is possible.

Outside of main body 103, or rather between fold lines 119 and lines 127 and sides 111, there exists flaps 121. These foldable flaps 121 are configured to fold along lines 119 so as to extend over first face 105 or second face 107. It is preferred that they fold over second face 107 so as to maintain adhesive layer 113 facing itself. Other situations may exist where one or more flaps 121 are folded over to first face 105. Flaps 121 may fold over toward one or more of faces 105 and 107 where multiple flaps 121 are used.

Figure 5:
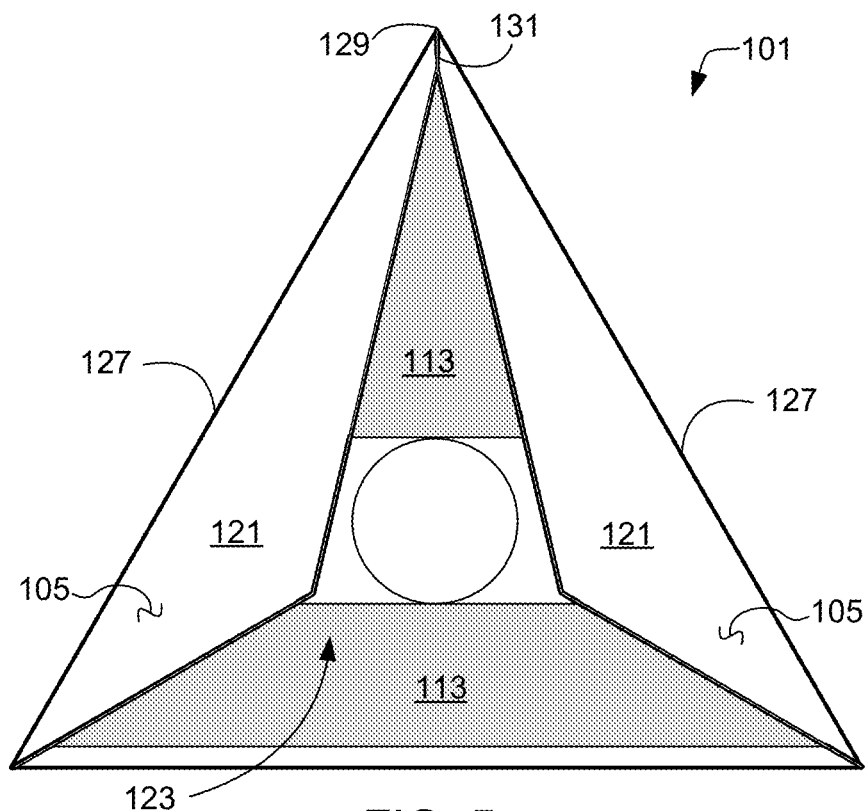
FIG. 5 is an alternate rear view of the modular trap assembly of FIG. 4 with flaps folded.
Figure 6:
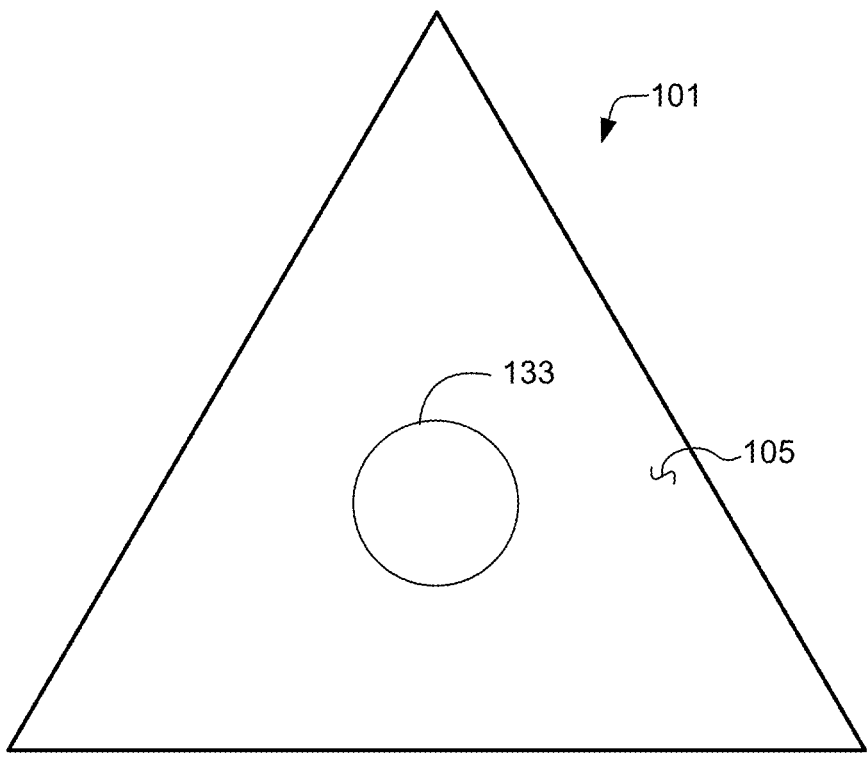
FIG. 6 is a front view of the modular trap assembly of FIG. 5.

Referring now also to FIGS. 5 and 6 in the drawings, a rear view and front view of assembly 101, as seen from FIG. 4, is illustrated. In this Figure, flaps 121 are folded over second face 107. First face 105 is shown in the rear view of FIG. 5. As seen, the overall shape of main body 103 is that of a triangle. Flaps 121 are folded along lines 119 such that the plurality of flaps 121 make contact along a flap edge 131. Flap edge 131 extends from tip 129 and along a portion of an edge of flap 121. The contacting location along such edge forms the flap edge 131. Flaps 121 avoid overlapping and do not require adhesive to maintain their folded position. A void space 123 is formed between flaps 121 and main body 103. A front view of assembly 101 is shown in FIG. 6.

As seen in all the figures to this point, an aperture 133 is depicted in main body 103. Aperture 133 is optionally used and is able to be punched out as needed by a user. For example, when assembly 101 is used as a flat glue trap, it is unnecessary to remove aperture 133 as it rests along a surface. However, a user may still remove aperture 133 when used in a flat glue trap configuration. This could be useful if assembly 101 laid over a hole and pests were to come up through the surface and walk across assembly 101. Mostly a user will punch out and form aperture 133 when used in a corner configuration. Through aperture 133, pests are configured to pass between the first face 105 and the second face 107. The edge(s) which define aperture 133 may be formed in a similar manner to that of lines 127 discussed above. It is also understood that aperture 133 is not limited to a central location or particular size along main body 103

Figure 7:
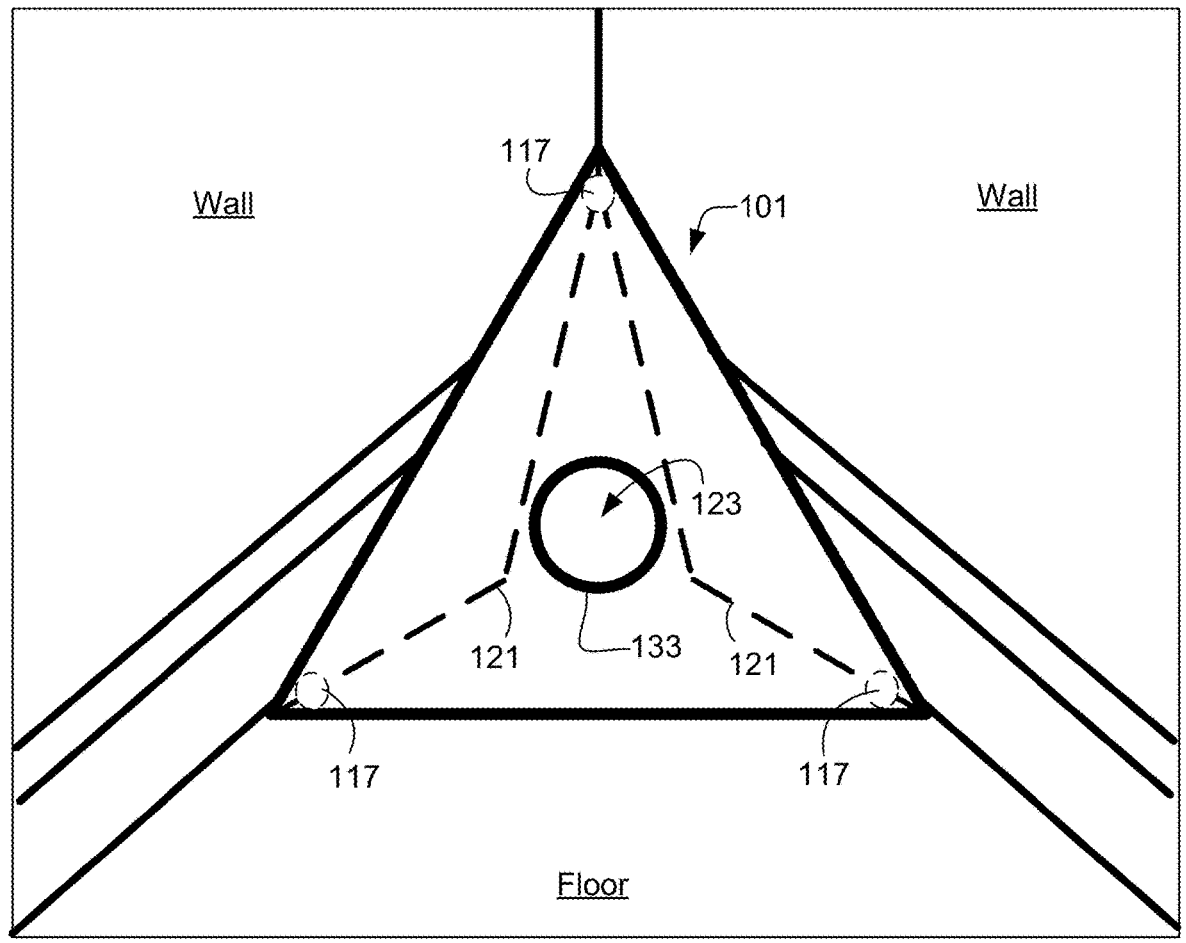
FIG. 7 is a front view of the modular trap assembly of FIG. 6 located in a corner along a surface.
Figure 8:
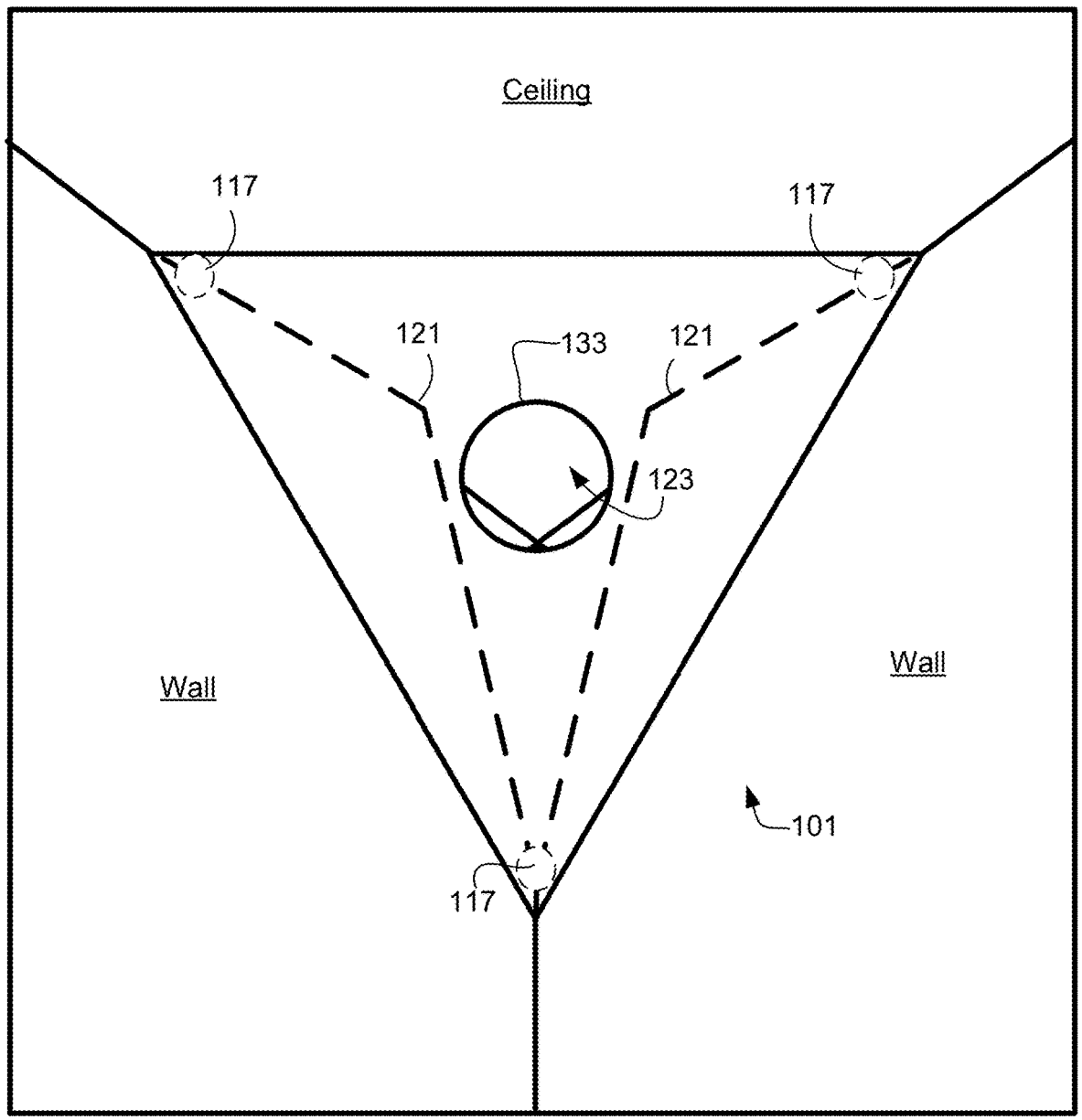
FIG. 8 is a front view of the modular trap assembly of FIG. 5 located in an elevated corner.

Referring now also to FIGS. 7 and 8 in the drawings, front views of assembly 101 are shown wherein assembly 101 is in a corner configuration and located in both an upper corner (FIG. 8) and a lower corner (FIG. 7). As installed, flaps 121 are folded backward into the corner. It is not required that flaps 121 contact any portion of a wall, ceiling, framing, or other structure apart from assembly 101. It is worth noting that the angle or orientation of lines 127 help to form a gap or space between flaps 121 below the flap edge 131. Flaps 121 do not obstruct the opening of aperture 133. Flaps 121 allow unobstructed access into void space 123 when in the corner. Additionally, the mere location of assembly 101 into a corner defines a void space between main body 103 and the corner structure. Therefore, the overall void space is a combination of void space 123 and the volume of space behind flaps 121 to the corner structure.

Attachment member 117 is located adjacent to at least one of the plurality of sides, or corners of main body 103. Attachment members 117 are configured to bond or secure main body 103 to the corner structure. In selected embodiments members 117 may be integrally formed onto a portion of the modular structure. For example, this could be seen with a tab that sticks out from a side 111 that has a tacky surface for attachment. In the Figures, another example is shown wherein member 117 is a detachable object that can be selectively located anywhere on the modular assembly. For instance, in the corners opposite from tip 129 and edge 131, attachment member 117 is located on second face 107 and/or a portion of first face 107. Along edge 131, attachment member is in communication with first face 105. Attachment member 117 is placed along edge 131 and is useful in helping to maintain contact along that edge and to maintain the overall size of void space 123. They are removable as needed. Numbers more or less than those depicted are permitted.

It should be noted that pests may enter assembly 101 in the corner configuration through aperture 133 and/or through any potential gap between sides 111 and the corner structure. Additionally, as adhesive layer 113 extends onto flaps 121, flaps 121 act to extend the surface area or coverage of adhesive layer 113 to sides adjacent the corner structure. Flaps 121 may be relatively parallel to the corner structure in some embodiments.

Figure 9:
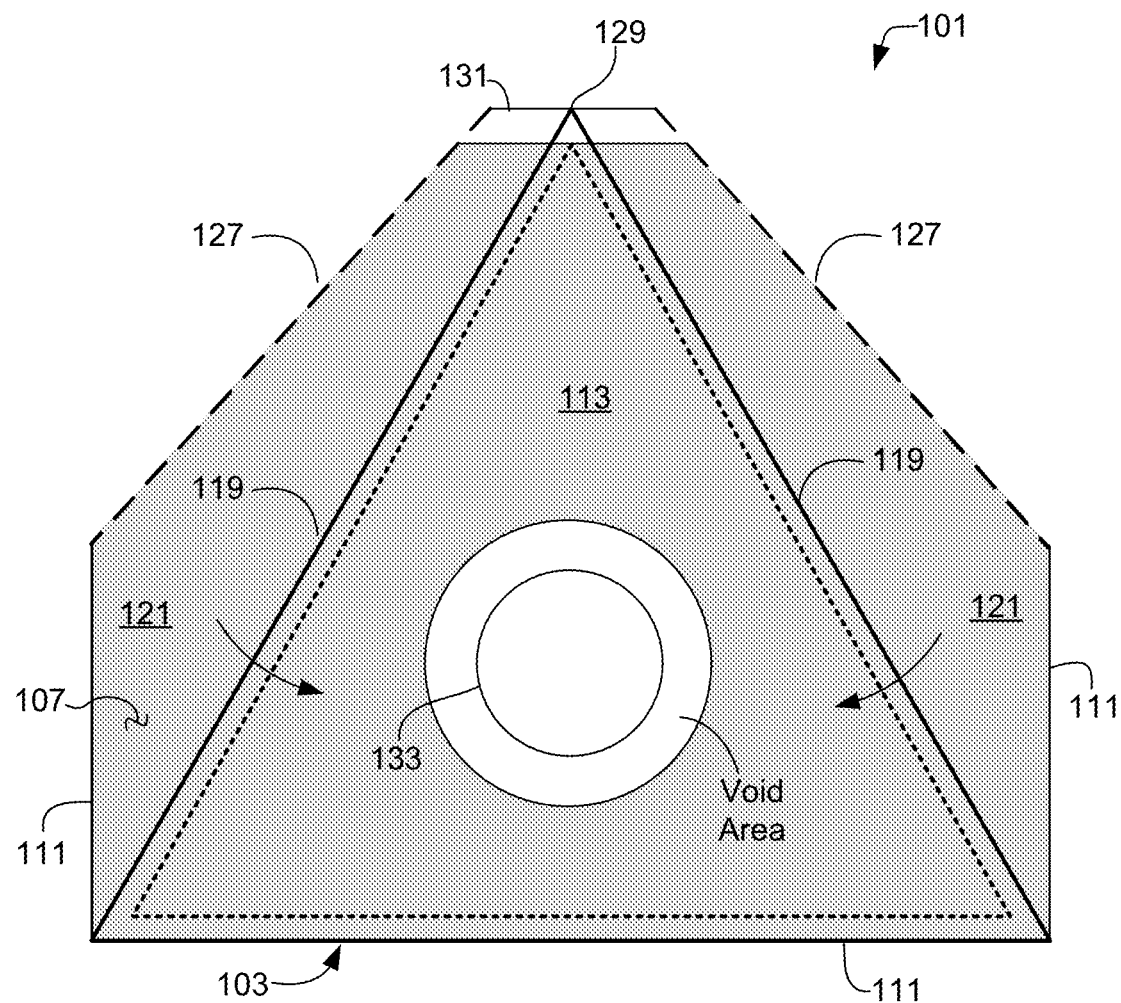
FIG. 9 is an alternate rear view of the modular trap assembly of FIG. 4 with a central void area.

Referring now also to FIG. 9 in the drawings, an alternate representation of the void area of layer 113 is illustrated. It should also be noted that adhesive layer 113 may be oriented or laid out in any pattern along second face 107. Adhesive layer 113 is configured to cover a portion of second face 107. Although all of face 107 may be covered, it is preferred that some portions around aperture 133 remain uncovered by adhesive layer 113 so as to prevent congestion at aperture 133. This can happen if a pest gets trapped within the aperture 133 when only partially through it. Therefore, ideally by granting additional room around aperture 133 devoid of adhesive layer 113, a pest may enter more fully prior to contact with layer 113. This helps to keep aperture 133 uncongested.

As seen through FIGS. 1-5, one such manner of keeping an uncongested aperture is to leave a strip devoid of adhesive layer 113 wherein layer 113 is vacant between opposing sides 111 of main body 103. Layer 113 may be split to have a top section and a bottom section wherein aperture 133 divides the two sections. Layer 113 may be configured to only contact a portion of the circumference of aperture 133 as shown. No contact is necessary, however.

However, in FIG. 9, the void area of layer 113 may exist only around the circumference or perimeter of aperture 133, wherein no contact with aperture 133 is made. In such an example, layer 113 would be removed from contact with aperture 133 and be spaced away a selected distance around the perimeter of aperture 133. This may permit the void area to be the same shape or different shape compared to the shape of aperture 133. This may provide the advantage of leaving all other parts of second face 107 to be covered by layer 113.

It is understood that flaps 121 may be fully covered by layer 113 without regard to the location or existence of any vacant spacing on second face 105 within main body 103. Furthermore, it is understood that attachment members 117 may be used to releasably secure assembly 101 to any structure or part that may be used (i.e. bracket) to help locate assembly 101 to a corner structure.

The current application has many advantages over the prior art including at least the following: (1) modular design to facilitate various methods of capture; (2) corner applied insect trap device; (3) ability to lure insects to the trap; (4) disposable and interchangeable design; and (5) increased surface area of adhesive within the total void space by extending the adhesive to the flaps, such that the flaps act to locate adhesive adjacent the corner structure.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A trap assembly for entrapping and eliminating pests comprising:
   a modular structure having a main body with a first face and a second face, the modular structure also including a corner and a plurality of sides;
   an adhesive layer across a portion of the second face;
   a detachable film cover laying across the adhesive layer to permit handling without contact of the adhesive layer; and
   an attachment member adjacent to at least one of the plurality of sides, the attachment member being detachable and configured to bond or secure the modular structure to a surface; and
   a portion of the main body configured to be detachable so as to form an aperture within the main body, the aperture to permit passage of the pests between the first face and the second face, the adhesive layer is above and below the detachable portion of the main body;
   wherein the modular structure includes a fold line extending between neighboring sides of the plurality of sides so as to permit a first flap to be folded, the folded first flap is configured to create a three-dimensional void space with the main body.

2. The assembly of claim 1, wherein the corner is detachable.

3. The assembly of claim 1, wherein the first flap is folded over the second face.

4. The assembly of claim 1, wherein the adhesive layer contacts a portion of a circumference of the detachable aperture.

5. The assembly of claim 1, wherein the coverage of the adhesive layer on the second face is vacant between opposing sides of the plurality of sides thereby forming a strip of adhesive free surface on the second face.

6. The assembly of claim 1, wherein the detachable film covers the entire second face.

7. A trap assembly for entrapping and eliminating pests comprising:
- a modular structure having a main body with a first face and a second face, the modular structure also including a plurality of corners and a plurality of sides;
- an adhesive layer across a portion of the second face;
- a detachable film cover laying across the adhesive layer to permit handling without contact of the adhesive layer;
- an attachment member adjacent to at least one of the plurality of sides of the modular structure, the attachment member being detachable and configured to bond or secure the modular structure to a surface;
- wherein the modular structure includes a first detachable line extending between neighboring sides of the plurality of sides across a first corner of the plurality of corners, the first corner being detachable along the first detachable line;
- wherein the modular structure includes a first fold line between the same neighboring sides as the first detachable line so as to form a first foldable flap in the modular structure, the first foldable flap is configured to create a three-dimensional void space with the main body;
- a second detachable line extending between neighboring sides of the plurality of sides across a second corner of the plurality of corners, the second corner being detachable along the second detachable line, the first detachable line and the second detachable line pass through a common side of the plurality of sides;
- wherein the modular structure includes a second fold line between the same neighboring sides as the second detachable line so as to form a second foldable flap in Amendment the modular structure, the second folded flap is configured to create a three-dimensional void space with the main body and the first foldable flap; and
- a portion of the main body configured to be detachable so as to form an aperture within the main body, the aperture to permit passage of the pests between the first face and the second face, the adhesive layer is above and below the detachable portion of the main body.

8. The assembly of claim 7, wherein the first foldable flap and the second foldable flap contact each other along a flap edge without overlapping.

9. The assembly of claim 8, wherein the attachment member is located along the flap edge.

10. The assembly of claim 7, wherein the first foldable flap and the second foldable flap are folded over the second face.

11. The assembly of claim 7, wherein the adhesive layer contacts a portion of a circumference of the detachable aperture.

12. The assembly of claim 7, wherein the coverage of the adhesive layer on the second face is vacant between opposing sides of the plurality of sides thereby forming a strip of adhesive free surface on the second face.

13. The assembly of claim 7, wherein at least one of the detachable lines is a perforated edge.

\* \* \* \* \*